United States Patent

Price et al.

[11] Patent Number: 5,806,304
[45] Date of Patent: Sep. 15, 1998

[54] CATALYTIC TREATMENT OF ENGINE EXHAUST GAS

[75] Inventors: Stuart Graham Price, Heathridge; David Richard Worth, Shenton Park, both of Australia

[73] Assignee: Orbital Engine Company (Australia) Pty. Limited, Balcatta, Australia

[21] Appl. No.: 612,845
[22] PCT Filed: Sep. 20, 1994
[86] PCT No.: PCT/AU94/00566
    § 371 Date: Mar. 21, 1996
    § 102(e) Date: Mar. 21, 1996
[87] PCT Pub. No.: WO95/08703
    PCT Pub. Date: Mar. 30, 1995

[30] Foreign Application Priority Data

Sep. 21, 1993 [AU] Australia .................. PM 1368

[51] Int. Cl.⁶ .............. F01N 3/20; F01N 3/36; F02D 33/00; F02M 33/02
[52] U.S. Cl. .............. 60/274; 60/283; 60/286; 60/300; 123/339.19; 123/518
[58] Field of Search .............. 60/274, 276, 283, 60/299, 300, 303, 286; 123/518, 520, 339.19

[56] References Cited

U.S. PATENT DOCUMENTS

| | | | |
|---|---|---|---|
| 4,993,225 | 2/1991 | Giacomazzi et al. | 60/283 |
| 5,207,058 | 5/1993 | Sasaki et al. | 60/284 |
| 5,209,061 | 5/1993 | Takeshima | 60/278 |
| 5,239,824 | 8/1993 | Matsumoto | 60/283 |
| 5,245,974 | 9/1993 | Watson et al. | 123/518 |
| 5,272,873 | 12/1993 | Hamazaki | 60/283 |
| 5,353,590 | 10/1994 | Pettit et al. | 60/283 |
| 5,417,059 | 5/1995 | Hartel et al. | 60/303 |
| 5,544,483 | 8/1996 | Heuer | 60/303 |
| 5,617,721 | 4/1997 | Slawson | 60/300 |

FOREIGN PATENT DOCUMENTS

| | | |
|---|---|---|
| 0 488 254A1 | 6/1992 | European Pat. Off. |
| 41 34 199A1 | 4/1993 | Germany . |
| 1 395 237 | 5/1975 | United Kingdom . |

OTHER PUBLICATIONS

International Publication No. WO 91/13521 published Sep. 5, 1991.
Patent Abstract No. 3–242415 Oct. 1991 Japan.
Patent Abstract No. 62–251415 Nov. 1987 Japan.
Patent Abstract No. 59–58143 Apr. 1984 Japan.

*Primary Examiner*—Willis R. Wolfe
*Attorney, Agent, or Firm*—Nikaido, Marmelstein Murray & Oram LLP

[57] ABSTRACT

A method and apparatus for managing the operation of an internal combustion engine including an exhaust system having a catalytic treatment means to treat exhaust gas passing through the exhaust system. The method comprises introducing fuel in a vaporized or readily vaporized state to the exhaust system upstream of the catalytic treatment means to assist in raising the catalytic treatment means to a temperature which allows effective operation thereof.

21 Claims, 3 Drawing Sheets

CATALYTIC TREATMENT OF ENGINE EXHAUST GAS

This invention relates to internal combustion engines and the management of the catalytic treatment of the exhaust gas from such engines.

In a majority of the developed countries of the world, there exist regulations regarding the release of a wide range of pollutants from motor vehicles into the atmosphere. One of the principal sources of such pollutants is the exhaust gas from the engine of the vehicle wherein the level of undesirable pollutants therein is largely dependent upon the level of control achievable over the combustion process within the respective cylinders or combustion chambers of the engine and any after-treatment of the exhaust gas by means such as catalytic converters or the like.

Another source of pollutant from motor vehicles is the vapour generated in the fuel tank thereof which may contain a substantial level of hydrocarbons. In this connection, it is known that in operating a vehicle, the fuel tank can reach a temperature of the order of 55° C. or more. Accordingly, there is a significant level of vapour generated in the fuel tank which may be harmful if released in an untreated or uncontrolled manner to atmosphere. Currently, most regulations relating to the control of pollutants or emissions arising from fuel vapour generated by a vehicle require the fuel tank of the vehicle to be sealed when the vehicle is in operation. Consequently, it is necessary to provide a suitable form of venting of the fuel tank including a separator wherein vapour released from the fuel tank is processed to remove any fuel vapour from the air component thereof before the latter is released to atmosphere. Usually, the separator is of the known activated carbon type commonly referred to in the automotive industry as a "carbon canister".

It is known in some prior art systems such as fuel injected, homogeneous charge, four stroke engines to provide an air flow through the carbon canister when the engine is in operation so that fuel collected in the canister as a result of the vapour in the fuel tank may be delivered into the air induction system of the engine to then pass into the engine combustion chambers and be burnt therein before being exhausted from the engine by way of an exhaust system thereof. It will be appreciated that the purging of the carbon canister in this way will provide an additional supply of fuel to the engine which would, unless counteracted, cause it to run rich or even misfire if the rich misfire limit of the particular engine is exceeded.

In homogeneous charge, four stroke engines, this additional supply of fuel to the engine will typically be sensed by the overall air/fuel ratio management system and more particularly by an exhaust gas oxygen sensor or "Lambda" sensor thereof and a corrective action in respect of the fuelling rate will typically be made. Such systems are commonly referred to as "closed loop" systems since the correct air/fuel ratio is maintained through a feed-back loop. Thus, when the carbon canister is being purged as described above and thereby providing additional fuel to the engine, this action will be counteracted by a reduction of the fuelling rate by the engines fuelling system (eg: fuel injectors) as dictated by the Lambda sensor.

However, the above described system for purging the carbon canister is not suitable for use in lean-burn engines, which normally operate under an "open-loop" system and do not utilise a Lambda sensor during lean-burn operation, since it is difficult to compensate for the additional fuel being supplied to the engine during the canister purging process.

There has previously been proposed in the applicant's granted Australian Patent No. 641223 a method to communicate the carbon canister with a compressor so that the intake air to the compressor is passed through the canister to take up fuel therein. The fuel taken up by the air is subsequently delivered to the engine combustion chambers with the compressed air used during the fuel injection process. This proposal has the advantage that the purged fuel from the carbon canister delivered with the compressed air is of a relatively small proportion compared to the main fuel supply and therefore does not significantly influence the engine operation, and is particularly applicable to lean-burn two stroke cycle engines.

In regard to the control of the emissions in the exhaust gas released from a vehicle engine, it is customary to provide a catalytic device in the exhaust system of the engine to promote reactions in the exhaust gas to reduce emissions prior to the release of the exhaust gas to the atmosphere. Such catalytic devices or catalysts possess the ability to promote conversion of unburnt or partially burnt fuel and other contaminants released from the combustion chamber into the exhaust system, into an acceptable constituent of the exhaust gas prior to release thereof to atmosphere. The effectiveness of the operation of such catalysts is most commonly related to the operating temperature thereof and accordingly it is important to maintain the catalyst at or above a particular temperature (ie: the "light-off" temperature thereof) so that the catalyst has the ability to promote and maintain the effective treatment of unburnt or partially burnt fuel and other contaminants within the exhaust gas.

One of the problems with such catalytic devices in the treatment of exhaust gas is that under certain engine operating conditions, which may repeatedly occur during engine use, the catalyst is not maintained at or above a required operating temperature necessary for effective treatment of the exhaust gas to reduce the emissions therein to an acceptable level. Typical conditions that can lead to the temperature of the catalyst being below the required or light-off temperature may be encountered during and shortly after start-up of the engine and when the engine is running at relatively low fuelling rates, such as during idle or low load operation, or during engine "over-run", that is, when the engine is being driven by the vehicle such as when coasting down a hill with the engine in gear. Further, it has been found that maintaining the catalyst at or above the required temperature can be particularly difficult in engines operating on the lean-burn principle and particularly in stratified charge, lean-burn engines in view of the relatively low temperature of the exhaust gases that are typically generated in such engines. This situation however is also experienced in both two and four stroke cycle engines operating at stoichiometric air/fuel ratios, and will become a greater problem as emission regulations become more stringent.

Experiments have shown that the introduction of liquid fuel directly into the exhaust system of an engine upstream of the catalyst, with the intention that combustion of that fuel will provide sufficient heat input to the catalyst to maintain it at the required operational temperature, has not been completely successful. It is believed that when the normal exhaust gas is at a temperature insufficient to maintain effective operation of the catalyst that the catalyst is also ineffective in initiating and sustaining combustion of the additional liquid fuel introduced into the exhaust system. Accordingly, it is suspected that the fuel introduced directly into the exhaust system upstream of the catalyst has the effect of taking up heat from the exhaust gas and the catalyst contrary to the intended purpose of inputting heat thereto. Further, the introduced fuel to the exhaust gas can give rise to an emissions penalty if that fuel is not completely combusted or if it is not effectively processed by the catalyst.

It is an object of the present invention to provide a method and apparatus for establishing and maintaining effective operation of the catalyst in an engine exhaust system.

With this object in view, the present invention provides in one aspect a method of managing the operation of an internal combustion engine including an exhaust system having a catalytic treatment means to treat exhaust gas passing through the exhaust system and a fuel vapour separation means for separating fuel vapour generated by the fuel system of the engine, said method comprising introducing fuel in a vaporised or readily vaporised state from the separation means to the exhaust system upstream of the catalytic treatment means to thereby maintain the catalytic treatment means at, or assist in raising the catalytic treatment means to a temperature which allows effective operation thereof.

Fuel can also be introduced when the temperature of the catalytic treatment means is above said first selected temperature and below a second selected temperature of the catalytic treatment means, said second selected temperature being higher than said first selected temperature. This can maintain the catalytic treatment means within a temperature range which allows effective operation thereof.

The introduction of fuel may be discontinued when the temperature of the catalytic treatment means exceeds the second selected temperature. This helps to prevent the catalytic treatment means from being damaged due to overheating.

Conveniently, the fuel is taken from the engine fuel system in a vapour form or is heated (without reducing the temperature of the exhaust gas entering the catalytic treatment means) to a vapour form before introduction to the exhaust system to thereby reduce the heat energy input required to combust the fuel after the delivery of the fuel into the exhaust system and promote the complete combustion thereof. Consequently, the heat energy balance resulting from the combusting of the fuel introduced into the exhaust system results in the availability of more heat energy to maintain or attain the required effective operation of the catalytic treatment means. The path of the fuel may be arranged to pass in close proximity to a heat source associated with the engine, such as for example, the exhaust system downstream of the catalytic treatment means or the engines cooling system, to receive sufficient heat therefrom to vaporise the fuel before entry to the exhaust system. The vaporised state of the fuel also ensures that the fuel will be completely combusted in the catalytic treatment means and that no uncombusted fuel can pass through the catalytic treatment means to increase the level of HC's in the engine emissions. Further, complete combustion of the fuel vapour ensures that no catalyst damage can occur due to localised combustion in the catalytic treatment means of liquid fuel droplets.

Alternatively, fuel vapour generated during normal engine operation, such as within the fuel storage tank, can be separated from the engine's normal fuel supply and delivered to the exhaust system upstream of the catalytic treatment means. The vaporised fuel removed from the fuel tank may be delivered directly to the engine, or stored in liquid or vapour form for subsequent delivery. Heat from a suitable source including the engine can be applied to the stored liquid or vapour prior to delivery to the exhaust system to enhance the ignitability and/or combustibility of the vapour in the exhaust system. The path of the fuel may for example be arranged to pass in close proximity to the exhaust system downstream of the catalytic treatment means to thereby be heated by the hot exhaust gases. Alternatively, the fuel may be arranged to be heated by the heat emitted from the hot engine coolant of the engine. It should be noted that the heating of the fuel is attained from a source that will not reduce the exhaust gas temperature upstream of the catalyst.

It has been found that the fuel provided by separation of the vapour from the engines normal liquid fuel is typically more volatile than the liquid fuel from which it is derived, and is therefore more readily ignitable than the liquid fuel as a whole, thus requiring less heat energy input to achieve combustion. Accordingly, when fuel derived from the fuel tank vapour is delivered into the exhaust system, it is more readily ignitable, even during the temperature conditions that exist in the exhaust system during idle operation or engine over-run conditions, or similar low temperature exhaust conditions, where the temperature of the catalytic treatment means is prone to fall below that required for effective operation thereof. It is thought that the fuel derived from the fuel tank vapour is composed of a lighter fraction of the fuel since its boiling point is at a lower temperature than the heavier fractions from which it has been separated.

The storage of the lighter fraction component of the fuel is conveniently performed by the carbon canister as conventionally provided in motor vehicles and is conveniently conveyed to the engine exhaust system by creating an air flow through the carbon bed in the canister to entrain the fuel in vapour or droplet form, and convey it to a suitable location for delivery to the exhaust system. The separated fuel can be delivered directly to the exhaust system upstream of the catalytic treatment means, or under specific engine operating conditions, can be delivered to one or more combustion chambers of the engine and at least partially passed therethrough to the exhaust system without becoming ignited therein. If the separated fuel is delivered into the exhaust system of an engine, the delivery must be at a location where the separated fuel will not influence any air/fuel ratio control system used by the engine. Thus, for example, the separated fuel must be introduced downstream of the conventional Lambda sensor commonly provided in the exhaust system of homogeneous charge, four stroke, cycle engines or any equivalent device used to measure the air/fuel ratio of the mixture within the engine combustion chambers.

As the need to introduce fuel into the exhaust system principally arises when the engine is operating at low fuelling rates, it is possible to select a timing and manner of introduction that will permit the fuel to at least partially pass through the combustion chamber without igniting. Also the introduction of the fuel to the combustion chamber must be such that rich misfiring of the engine will not arise. The preferred conditions for introduction of the separated fuel via the combustion chamber exist in lean-burn engines during operation at low or zero fuelling rates as occurs during idle or over-run of the engine. Under such conditions, the cylinder charge is highly stratified usually as a result of delivery of the combustion fuel to the cylinder late in the compression stroke. Accordingly, if the separated fuel for combustion in the exhaust system is introduced early in the induction portion of the cylinder cycle, that fuel will be sufficiently widely dispersed in the cylinder to form an air/fuel mixture too lean to ignite and/or located in the bulk quench portion of the combustion chamber. That is, incomplete or no combustion of the lighter fraction of fuel occurs due to the fuel being below the lean flammability limit and/or bulk quenching effects.

Also, it is a common practice to not deliver any combustion fuel to one or more cylinders during engine over-run conditions, and even to not actuate the ignition means of the corresponding cylinders. Also, one cylinder of a multi-cylindered engine may be "shut-down" during certain warm-up procedures. Thus, under certain conditions, the separated fuel for combustion in the exhaust system can be introduced into one or all of the cylinders to which the combustion fuel has not been introduced as a means of delivering it to the exhaust system in an uncombusted state.

It is envisaged that fuel may also or alternatively be injected from the fuel rail where a lack of fuel vapour is detected. The fuel can be injected through an injector into a cylinder which has been "shut down" and is therefore not firing. The heat within the cylinder and heat generated by the compression of the gas therein will heat the fuel vapour which can then be passed into the exhaust system and combined with any further fuel vapour upstream of the catalytic treatment means.

Where the separated fuel is introduced to the exhaust system via a combustion chamber of the engine, that separated fuel can be initially delivered into the engine air induction system including into the intake or crankcase of a crankcase scavenged two stroke cycle engine in which case it may be only to the crankcase of a specific cylinder which is shut-down as previously mentioned. Furthermore, introducing the lighter fraction fuel to the intake or crankcase of a two stroke engine will inevitably lead to some of this fuel being "short circuited" to the exhaust system during the scavenging process thus ensuring that some of the lighter fraction fuel will reach the catalyst.

Conveniently, the delivery of the separated fuel for combustion in the exhaust system is also in part controlled in respect to timing and/or rate of delivery, preferably in relation to the engine load, speed or temperature and/or in relation to the temperature of the exhaust gas. Alternatively, the delivery of the separated fuel may be at a preset rate either continuously or at a predetermined fixed or variable time interval.

There is also provided according to another aspect of the present invention, an internal combustion engine installation including an exhaust system incorporating a catalytic treatment means for treating exhaust gases passing through the exhaust system, a fuel tank for storing fuel for the engine, a fuel/air separator for receiving vapour generated in the fuel tank and for separating fuel from the air of the vapour, and means for effecting delivery of the separated fuel in a vaporised or readily vaporised state from the separator into the engine exhaust system upstream of the catalytic treatment means to thereby maintain the catalytic treatment means at, or assist in raising the catalytic treatment means to a temperature which allows effective operation thereof.

Conveniently, a pump is provided to draw fuel from the separator means and deliver it to the exhaust system at or upstream of the catalytic treatment means. The operation of the pump may be continuous while the engine is operating or may operate on a preset cyclic basis. Preferably, the operation of the pump is in part responsive to the engine operating conditions, or the temperature of the catalytic treatment means or the exhaust gas in the exhaust system at or upstream of the catalytic treatment means.

The engine may include an air regulator and excess air from the regulator may alternatively be directed through the separator to thereby delivery fuel to the exhaust system.

Alternatively, negative pressure pulsations may be used to draw in fuel vapour into an appropriate control arrangement in place of using a pump to deliver the fuel vapour from the separator to the exhaust system. Such an arrangement is commonly used to draw fresh air into certain vehicle exhaust systems during warm-up.

It will be appreciated that by providing the lighter fraction fuel to the intake system of an engine, it may not be necessary to use a separate pump as is the case where the lighter fraction fuel may be provided directly to the combustion chamber or exhaust system of the engine. Furthermore, by providing the lighter fraction fuel to the intake system of the engine, it will become exposed to higher temperatures in the combustion chamber and therefore will be more readily ignitable at the catalytic treatment means.

If the temperature conditions in the fuel tank are such that insufficient or no vapour is being generated in the fuel tank, provision can be made to heat the fuel in the fuel tank to a level that will establish a sufficient vapour generation rate. Heat for this purpose can be generated for example by operation of the fuel pump, located in the fuel tank, for a period greater than required to maintain the normal fuel supply to the engine. Also, provision can be made to lower the pressure in the fuel tank to assist the generation of fuel vapour. Further, the operation of the fuel pump may be controlled in order to respond to engine shut-down to ensure sufficient fuel vapour is supplied to the separator means to promote effective operation of the catalytic treatment means at the next engine startup. Alternatively, the vapour pressure in the fuel tank can be reduced thus liberating additional vapour. In the conventional fuel tank system, the fuel tank is allowed to build-up a pressure of the order of 10 kpa before release is provided to the carbon canister. This is accomplished by means of a pre-set check valve.

It should be noted that there are other sources of fuel vapour that can be utilised. Fuel vapour is generated within the fuel rail which may be tapped and utilised. Alternatively, a large amount of fuel vapour is generated at the fuel regulator where there is a significant drop in fuel pressure. This can also provide a source of fuel vapour. This fuel vapour may be directed to the fuel tank or may be introduced directly to the exhaust system or to the air induction system.

According to a further aspect of the present invention, there is provided a method of determining the fuel vapour concentration delivered from a separator of an internal combustion engine, the engine having an idle speed control system for controlling the fuelling rate to the engine during idle, the separator collecting fuel vapour from the fuel tank, wherein the fuel vapour is purged from the separator to the engine when the engine is idling resulting in an increase in the idle speed of the engine, and wherein the idle speed control system reduces the fuelling rate to the engine to lower the idle speed, the reduction in the fuelling rate providing an indication of the fuel vapour concentration.

The improved operation of the catalytic treatment means resulting from the fuel vapour input to the exhaust system enables the catalytic treatment means or catalyst to be located a greater distance downstream from the engine exhaust ports, with resultant benefit to the durability and effective life of the catalyst in that degradation and defoliation thereof is reduced. In particular, it is possible in some engines to avoid the use of a "close coupled" catalyst and position all catalyst components in the exhaust system in the more conventional "under-body" position.

The presently proposed use of fuel vapour to assist in the effective operation of the catalytic treatment means that treats the exhaust gas may be used in conjunction with other strategies that aid the effective operation of the catalyst in the control of exhaust emissions such as those described in the applicants co-pending PCT patent application number PCT/AU94/00028.

The invention will be more readily understood from the following description of some practical arrangements of exhaust gas treatment methods and apparatus.

Figure 1:
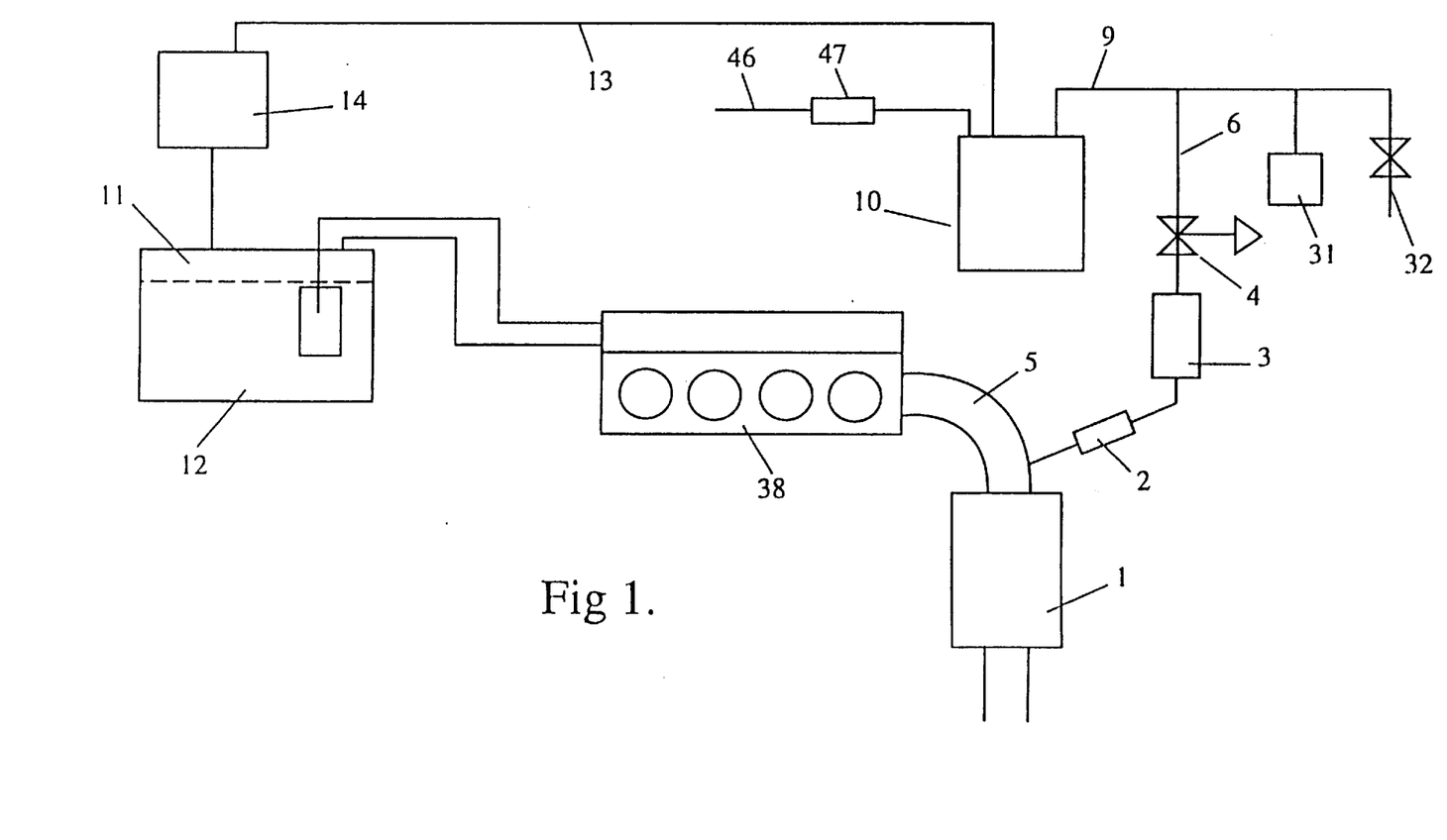
FIG. 1 is a diagrammatic layout of a system for providing a controlled supply of fuel or fuel vapour to an engine exhaust system.

Referring now to FIG. 1, the separator 10 is of a conventional construction having a filter medium of activated carbon and is conventionally referred to in the automotive industry as a "carbon canister". The vapour space 11 in the fuel tank 12 communicates by way of the conduit 13 with the input side of the separator 10. The check valve 14 located along the conduit 13 is set so as to open and permit a flow of vapour from the fuel tank 12 to the separator 10 when the pressure of the vapour in the fuel tank 12 is greater than a selected pressure value such as, for example, 10 kPa above the pressure in the separator 10. This preset pressure is conventionally utilised to prevent excessive amounts of vapour being liberated whilst not exceeding the required safety aspects of the fuel tank 12.

The branch conduit 6 communicates the separator outlet conduit 9 with the engine exhaust system 5 via the solenoid operated valve 4, the pump 3 and the flame arrester 2. When the valve 4 is open and the pump 3 is operating, air is drawn into the air duct 46 and hence through the separator 10 to purge fuel therein and deliver it into the engine exhaust system 5 upstream of the catalyst 1. To assist in the vaporising of the fuel in the canister 10, provision can be made to heat the canister or heat the air drawn therethrough. For example, the heater 47 is provided in the air duct 46 to heat the air drawn therethrough prior to entry to the separator 10, thus improving the vaporisation of the fuel in the separator 10.

It is to be understood that the pump 3 can also be arranged to deliver the fuel or fuel vapour withdrawn from the separator 10 to other areas of the engine 38 for subsequent delivery into the exhaust system 5 as hereinbefore discussed.

The conduit 9 is also provided with a conventional purge valve 31 and a valve controlled conduit 32 for delivering vapour to an air-assisted fuel injection system as further referred to hereinafter, and/or by selective operation of the respective valve controlled conduits 25 and 28, as disclosed in more detail in Australian Patent No. 641223 previously referred to herein.

Figure 2:
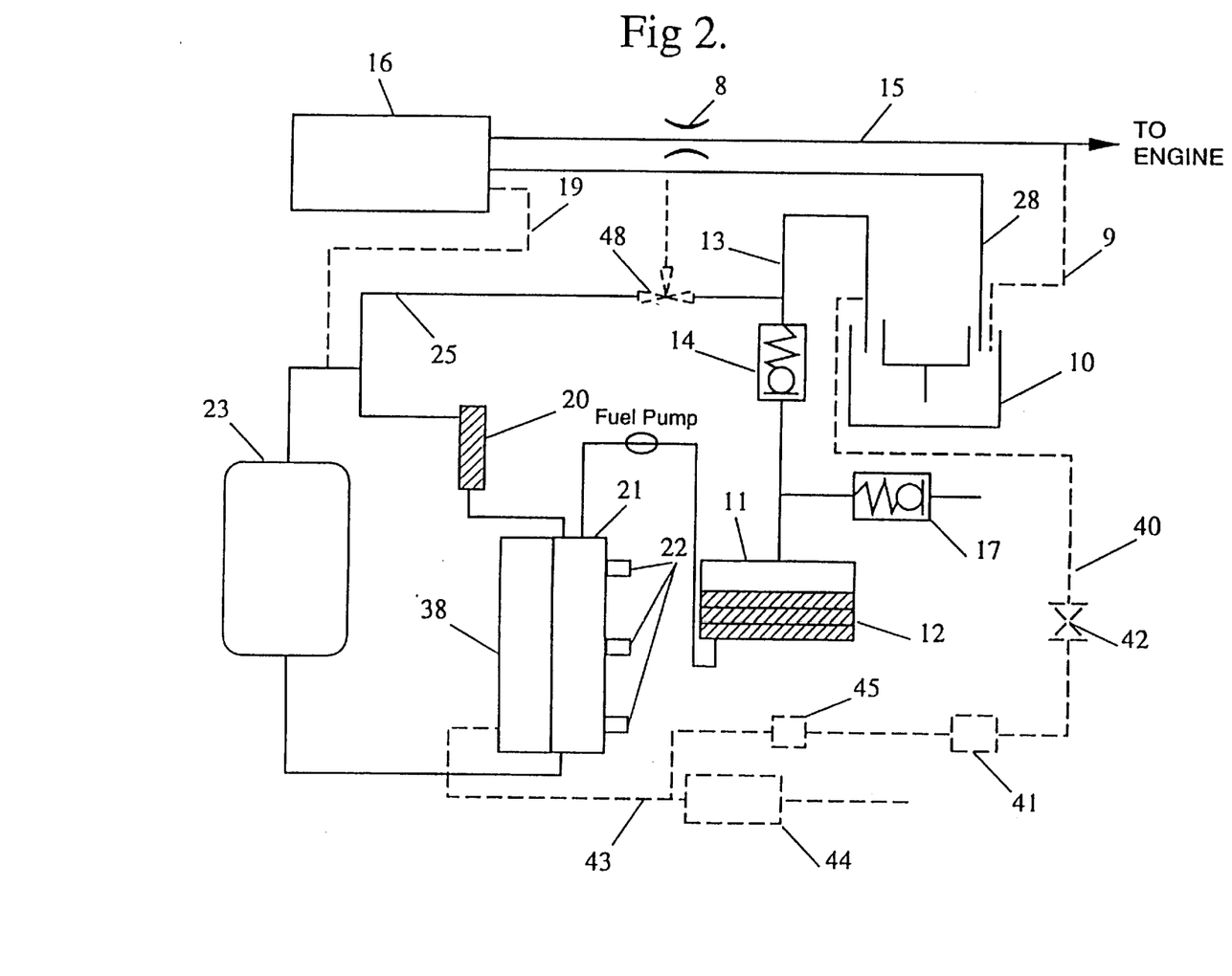
FIG. 2 is a diagrammatic layout of a system for providing a controlled supply of fuel vapour to an engine based on an embodiment of the vapour management system disclosed in the applicant's Australian Patent No. 641223.
Figure 3:
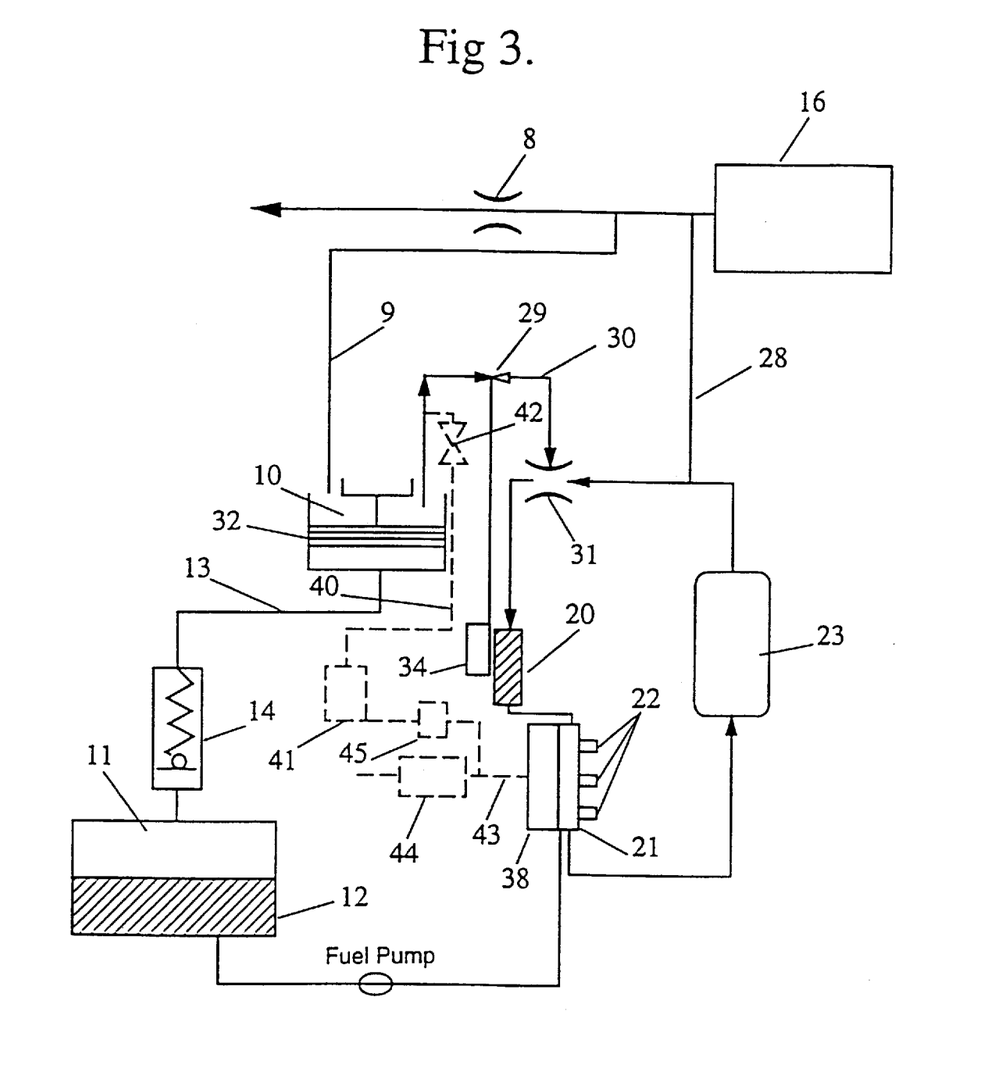
FIG. 3 is a modification of the system as shown in FIG. 2 and is also based on an embodiment of the vapour management system disclosed in the applicant's Australian Patent No. 641223.

Referring now to FIGS. 2 and 3, these figures correspond to the similarly numbered drawings of Australian Patent No. 641223 with the variations thereto in accordance with the present invention being shown in broken or dashed outline. The complete disclosure of Australian Patent No. 641223 is hereby incorporated in this specification by reference.

In FIGS. 2 and 3, equivalent components are identified by the same reference numerals as used in FIG. 1. Referring now specifically to FIG. 2, the dotted lines will serve to describe a vapour control and compressed air system as is currently practised in the field. The outlet side of the separator 10 communicates via the conduit 9 with the air induction passage 15 of the engine downstream of the conventional air box 16 and throttle valve 8 through which the air is drawn into the air induction system of the engine 38 when the engine 38 is in operation. Thus when the engine 38 is in operation and the pressure in the vapour space 11 in the fuel tank 12 is sufficiently high, vapour will pass from the fuel tank 12 through the separator 10 where the fuel in the vapour will be absorbed by the activated carbon and the treated air will pass into the air induction passage 15. The check valve 14 performs the same function as described with respect to FIG. 1. Whilst the engine 38 is running, the air which enters the air induction passage 15 from the separator 10 will form part of the air carried into the engine 38 through the air induction system, and when the engine 38 is not operating, the air passing into the air induction passage 15 from the separator 10 will be released to atmosphere. The check valve 17 communicates through the conduit 13 with the vapour space 11 in the fuel tank 12, and it is set to open if the pressure in the fuel tank falls below atmospheric.

The compressor 20 draws air from the air box 16 through the conduit 19 and delivers compressed air into the air rail 21 from which air is supplied to the series of fuel injectors 22 to effect delivery of fuel into the engine combustion chambers. The regulator 23 controls the pressure of the air in the air rail 21 of the engine 38, and air released by the regulator 23 is typically returned to the conduit 19 on the intake side of the compressor 20. However it is envisaged that this air released from the regulator 23 could also be delivered to different locations such as for example to an catalytic treatment means in the exhaust system or to various locations of the air induction system.

Although the compressor 20 normally draws its air supply from the air box 16 into which the cleaned air from the separator 10 may be delivered, the proportion of air passing through the air box 16 to the compressor 20 is small compared with the quantity of air passing through the air box 16 and passage 15 into the air induction system of the engine. Where there has been an accumulation of fuel in the separator 10, for example, following shut down of the engine 38, on subsequent start-up of the engine 38, air will be drawn through the separator 10 into the air induction passage 15. All of the fuel drawn into the air induction passage 15 with air from the separator 10 will immediately enter the air induction system and be carried into the combustion chambers of the engine 38. As a result of the majority of the fuel from the separator 10 being carried directly into the air induction system, an over-rich fuel/air mixture is delivered to the engine 38 and may lead to the generation of excessive contaminants in the exhaust gas and/or over-revving of the engine 38.

The invention disclosed in Australian Patent No. 641223 proposes to provide conduit 25 in place of conduit 19 to directly connect to the conduit 13 downstream of the check valve 14 and upstream of the separator 10 with the compressor 20 to allow fuel vapour discharged from the fuel tank 12 to be drawn directly into the intake port of the compressor 20. Accordingly, when the engine 38 is operating, the compressor 20 will draw fuel vapour from the fuel tank 12 and additional air as required from the engine air box 16 through the conduit 28, which is provided in place of conduit 9, and separator 10, the latter air being drawn in a reverse flow through the separator 10. In the situation where the vapour load from the fuel tank 12 is greater than can be taken by the compressor 20, then the excess vapour will pass through the separator 10 in the conventional manner and be delivered through the conduit 28 into the air induction system of the engine 38.

The present invention proposes to further modify the prior construction as described with regard to FIG. 2 by adding the conduit 40 to provide selective communication between the separator 10 and the pump 41 under the control of the solenoid operated valve 42. When the valve 42 is open, the pump 41 draws air through the separator 10 via the conduit 28 to entrain fuel vapour held therein and deliver it to the engine exhaust system 43 upstream of the exhaust catalyst device 44. The flame arrester 45 is located in the conduit 40 between the pump 41 and exhaust system 43 to prevent ignition of fuel vapour in the pump 41 or conduit 40.

As shown in FIG. 2, fuel vapour from the fuel tank 12 is also available for introduction to the combustion chamber(s) of the engine 38 with the compressed air used to effect injection of fuel into the combustion chamber(s), as described in more detail in Australian Patent No. 641223. If desired, a solenoid operated valve 48 can be incorporated in the conduit 25 to interrupt the air flow from the separator 10 to the compressor 20 when the valve 42 is open, and to permit air to flow directly from the air box 16 to the compressor 20.

FIG. 3 is another embodiment of the vapour purging and control system as described in Australian Patent No. 641223 which has been modified to incorporate the use of fuel vapour from the carbon canister or separator 10 in the management of exhaust gas emissions as proposed by the present invention. The arrangement for the supply of fuel vapour to the exhaust system 43 of the engine 38 is the same as described herein with reference to FIG. 2 and accordingly, the same reference has been used for the equivalent components. In the embodiment of FIG. 3, when the compressor 20 is operating, the rate of flow of air with or without fuel vapour from the separator 10 into the conduit 28 is substantially proportional to the engine speed by virtue of the provision of the venturi 31 provided in conduit 28. Thus by suitable calibration of the venturi 31, the relationship between the rate of air flow from the separator 10 to the compressor 20 and engine speed is determinable. Further discussion of this arrangement and the operation of the engine management ECU 34 will not be provided as the arrangement and operation of the overall fuel tank vapour management systems as disclosed in FIGS. 2 and 3 is described in detail in the specification of cross referenced Australian Patent No. 641223 and is therefore not repeated in this specification.

The present invention proposes to further modify the prior construction as described in relation to FIG. 3 by similarly adding the conduit 40 which, under the control of solenoid operated valve 42, provides selective communication between the separator 10 and the pump 41. When the valve 42 is open, the pump 41 draws air through the separator 10 via the conduit 9 to entrain fuel vapour held therein and to deliver it to the engine exhaust system 43 upstream of the exhaust catalyst device 44. As per FIG. 2, the flame arrester 45 is located in the conduit 40 between the pump 41 and exhaust system 43 to prevent ignition of fuel vapour in the pump 41 or conduit 40.

Reference has previously been made to procedures to aid the generation of fuel vapour in the fuel tank if insufficient vapour is available in the canister (separator) 10 to meet the prevailing demand. The need to generate vapour can be detected via the normal engine management system that controls the air/fuel ratio of the engine 38. When the engine 38 is at or near idle speed and the pump (3, 41) is operational, the fuel vapour supplied to the engine 38 will enrich the air/fuel supply above that determined by the management system and typically lead to an increased engine speed. The detection of this enrichment and/or increased engine speed will signal to the management system that a correction is necessary to the normal rate of fuel supply to counter the fuel being supplied from the vapour source.

Because lean-burn engines normally operate under an "open-loop" system so that there is no air/fuel ratio feedback, one way of determining the fuel vapour concentration being delivered from the separator 10 is by way of the engine's idle speed control system. The separator 10 is purged during idle operation of the engine 38. At idle, the engine speed is determined from the driver demand from which a fuelling rate value is set. However, if fuel vapour is purged into, for example, the induction system of the engine or directly into the engine cylinders, the idle speed will increase as a result of the increased level of fuelling. The idle control system would then reduce the true fuelling rate of the engine to lower the engine idle speed. This reduction in the fuelling rate value can provide an indication of the fuel vapour concentration being delivered from the separator 10. Other methods for determining the fuel vapour concentration delivered from the separator 10 are also envisaged. For example, orifices may be provided on the inlet and outlet sides of the separator 10 to enable measurement of the mass flow rate of air passing through the separator 10. The air will entrain fuel vapour while passing through the separator 10, and the increased mass of the air leaving the separator 10 can provide an indication of the fuel vapour concentration delivered from the separator 10.

The management system can be programmed to sense, when the vapour supply system is activated to meet the exhaust system (5,43) requirement, and the level of correction necessary to the engine fuel supply. If the level of correction is above a preselected value, the management system recognises there is a sufficient vapour supply available. If the vapour supply system is activated and the level of correction is below the preselected value, the management system recognises that there is insufficient vapour available in the vapour supply system and corrective action is necessary to increase the vapour supply. Alternatively, a sensor can be provided in the line supplying the vapour to the engine 38 to determine the fuel content thereof and the management system can be programmed to receive the sensed information and initiate corrective action. Notwithstanding the various methods for determining the fuel vapour concentration being delivered from the separator 10 and hence the need to perhaps generate fuel vapour, it is likely that any such vapour generation would be dependent upon the temperature of the catalytic treatment means (1,44) in the exhaust system (5,43).

In this specification, reference has been made to the "lighter fractions" of the fuel as being particularly desirable for combusting in the exhaust system (5, 43) to support the effective operation of the catalyst (1,44). As is well known, the petroleum based fuels commonly used in vehicle engines are made up of a range of hydrocarbons, each having a respective boiling temperature. The hydrocarbons are generally distinguished by their boiling point with the lower boiling point component referred to as 'lighter fractions' and the higher boiling point component as 'heavier fractions'. It is also to be noted that the lighter fractions have a lower specific heat which also contributes to a lower heat energy input to achieve vaporisation and subsequent combustion thereof.

Where vaporisation of the fuel in the fuel tank 12 is to be the principal vapour source, then the lighter fractions of the fuel that are utilised are those having a boiling temperature of up to about 55° C. However, where the fuel is to be vaporised by heat from other heat sources normally available within a vehicle, the heavier fractions of the fuel can be utilised, such as fractions having a boiling temperature of up to about 100° C. to 120° C. or even higher if an appropriate heat source is available.

It will be appreciated that, if the fuel is to be supplied to the exhaust system (5,43) in a vapour form, then it could be of a heavier fraction than if the fuel is vaporised within the exhaust system (5,43). The vaporised form of the heavier fraction of the fuel could require less heat energy input from the exhaust gas to achieve combustion thereof in the exhaust system than a liquid form of some lower fraction of the fuel.

The selection of the particular fractions of the fuel that is to be delivered to the exhaust system (5,43) is related to the particular characteristics of the engine and the available source of fuel vapour and/or heat energy to generate fuel vapour. Those skilled in the art would be capable to readily determine the upper limit of the fuel fraction that would be suitable to provide the vapour required to practice the invention in a particular engine operating in a particular environment.

The description of the invention made above is not intended to be limiting of the invention and other variations and modifications and variations may be made by those skilled in the art without departing from the range of the invention. For example, the compressor 20 as described with reference to FIGS. 2 and 3 may typically be sized or selected so as to be able to deliver high output pressures at correspondingly high engine speeds and/or loads.

Accordingly, at idle or low loads, the compressor 20 will generally produce excess air which will be discharged by way of the regulator 23.

Hence, as an alternative arrangement and one which would eliminate the pump 41, the blow-off air through the regulator 23 may be used to blow through the separator 10 and hence deliver fuel to the exhaust system 43 via the conduit 40 when the solenoid 42 is open. In this regard, a suitably positioned check valve would be required to be arranged in the system such that this "flow through" the separator 10 does not result in the fuel tank 12 being pressurised unless desired. Further, an appropriately located switching means could be arranged to facilitate for the switching between a system as described immediately above and one as described with reference to FIG. 2 of Australian Patent No. 641223.

We claim:

1. A method of determining a fuel concentration in a fuel vapour delivered from a fuel/air separator of an internal combustion engine, the engine having an idle speed control system for controlling the fuelling rate to the engine during idle speed, said method comprising the steps of collecting fuel vapour from the fuel tank in said fuel/air separator; purging said fuel vapour from the fuel/air separator to the engine when the engine is idling, resulting in an increase in the idle speed of the engine, so that the idle speed control system reduces the fuelling rate to the engine to lower the idle speed; and determining the reduction in the fuelling rate caused by the idle speed control so as to determine said concentration of said fuel in the fuel vapour.

2. A method of managing the operation of an internal combustion engine comprising an exhaust system having a catalytic treatment means to treat exhaust gas passing through the exhaust system, and a fuel/gas vapour treatment means for separating fuel in a fuel/air vapour generated by a fuel system of the engine from air in said fuel/air vapour, said method comprising the steps of separating the fuel within said fuel/air vapour from the air thereof to form a separated fuel, and introducing said separated fuel to the exhaust system upstream of the catalytic treatment means so as to contribute to establishing and maintaining a temperature thereof for effective treatment of the exhaust gas of the engine.

3. A method according to claim 2, wherein the fuel is delivered to at least one combustion chamber of the engine at predetermined engine operating conditions when there is no ignition of fuel in said chamber whereby at least a portion of the delivered fuel can pass uncombusted through to the exhaust system.

4. A method according to claim 2, wherein the engine is a two stroke crankcase scavenged engine, and the fuel is delivered to the crankcase of at least one cylinder of the engine at predetermined operating conditions when the engine is operating in highly stratified mode, whereby at least a portion of the delivered fuel can pass uncombusted through to the exhaust system.

5. A method according to claim 2, the internal combustion engine having an idle speed control system for controlling the fuelling rate to the engine during idle, wherein the fuel vapour is purged from the separator to the engine when the engine is idling, resulting in an increase in the idle speed of the engine, and wherein the idle speed control system reduces the fuelling rate to the engine to lower the idle speed, the reduction in the fuelling rate providing an indication of fuel vapour concentration delivered from the separator.

6. An internal combustion engine installation comprising an exhaust system having a catalytic treatment means for treating exhaust gases passing through the exhaust system, a fuel tank for storing fuel for the engine, a fuel/air separator for receiving a vapour generated in said fuel tank, said vapour comprising fuel and air, wherein said fuel/air separator separates the fuel from the air of said vapour, and means for delivering said separated fuel in an at least readily vapourised state into the engine exhaust system upstream of the catalytic treatment means so as to contribute to attaining an effective operational temperature of the catalytic treatment means.

7. An installation according to claim 6, wherein the fuel vapour is at least partially provided from a fuel regulator of the engine.

8. An installation according to claim 6, including means for lowering the pressure within the fuel tank to assist in the generation of fuel vapour.

9. An installation as claimed in claim 6, further including an idle speed control system for controlling the fuelling rate to the engine during idle, wherein the fuel vapour is purged from the separator to the engine when the engine is idling, resulting in an increase in the idle speed of the engine, and wherein the idle speed control system reduces the fuelling rate to the engine to lower the idle speed, the reduction in the fuelling rate providing an indication of fuel vapour concentration delivered from the separator.

10. An installation according to claim 6, including a source to heat the fuel in the fuel tank to a level that will establish a sufficient vapour generation rate.

11. An installation according to claim 10, wherein a fuel pump is located in the fuel tank whereby operation of the fuel pump provides the required heat.

12. An installation according to claim 11, wherein the fuel pump is operated in response to shutdown of the engine to ensure a sufficient supply of fuel within the separator during a subsequent engine start-up.

13. An installation according to claim 6, wherein the fuel vapour is at least partially provided from a fuel rail of the engine.

14. An installation according to claim 13, wherein negative pressure pulsations are used to draw fuel vapour from the separator to the exhaust system.

15. An installation according to claim 13, including an air regulator wherein excess air from the regulator is directed through the separator to thereby deliver fuel to the exhaust system.

16. An installation according to claim 13, including a compressor for providing compressed air to an air-assisted fuel injection system, wherein excess air from the compressor is delivered to the separator to deliver fuel to the engine.

17. An installation according to claim 13, wherein the fuel is introduced downstream of an overall air/fuel ratio sensor and upstream of a catalytic treatment means.

18. An installation according to claim 13, wherein the engine is a direct injected, air assisted, two stroke engine.

19. An installation according to claim 13, including a pump for drawing fuel from the separator and delivering said fuel to the exhaust system.

20. An installation according to claim 11, wherein the operation of the pump is continuous while the engine is operating.

21. An installation according to claim 11, wherein the pump operates on a preset cyclic basis.

* * * * *